United States Patent [19]

Wiklof et al.

[11] Patent Number: 4,855,757

[45] Date of Patent: Aug. 8, 1989

[54] THERMAL PRINTHEAD WITH STATIC ELECTRICITY DISCHARGE CAPABILITY

[75] Inventors: Christopher A. Wiklof, Everett; Gerald R. Apperson, Seattle, both of Wash.

[73] Assignee: Intermec Corporation, Lynnwood, Wash.

[21] Appl. No.: 63,167

[22] Filed: Jun. 17, 1987

[51] Int. Cl.[4] .................... G01D 15/10

[52] U.S. Cl. .................... 346/76 PH; 219/216; 400/120

[58] Field of Search .................... 346/76 PH, 76 R, 139 C; 219/216, 216 PH; 361/212, 214, 220, 221, 222, 223; 400/120 PH, 719; 174/104

[56] References Cited

U.S. PATENT DOCUMENTS 2,446,387 8/1948 Peterson .................... 174/104

FOREIGN PATENT DOCUMENTS 0007154 2/1980 Japan .................... 219/216
0151071 8/1985 Japan .................... 219/216
0029554 2/1986 Japan .................... 219/216 PH

OTHER PUBLICATIONS

F. A. Hawn, "Discharge of Unwanted Potentials On Photoconductive Insulating Plates & Dielectric Surfaces" IBM Tech. Disl., vol. 12, No. 12, 05/70.

*Primary Examiner*—E. A. Goldberg
*Assistant Examiner*—Huan H. Tran
*Attorney, Agent, or Firm*—Seed and Berry

[57] ABSTRACT

A thermal printhead for dissipating accumulated static electric charge. An electrically conducting outer layer is deposited over the surface of a thermal printhead that receives static charge from the passing print media or ribbon media. The layer, which can be a 100-angstrom-thick layer of chromium, is formed over a glass overglaze. If the surface overglass is passivated, a 10-angstrom-thick activating primer layer is formed on the glass overglaze before the chromium layer is deposited. The conductive outer layer is connected to electrical ground to dissipate the static electric charge as it is generated.

13 Claims, 3 Drawing Sheets

THERMAL PRINTHEAD WITH STATIC ELECTRICITY DISCHARGE CAPABILITY

TECHNICAL FIELD

The present invention relates to printheads for thermal printers, and more particularly, to printheads for thermal printers having the capability of discharging static electricity that is generated as the result of the passage of a print ribbon or printer stock past the printhead.

BACKGROUND ART

Thermal printers create images on a thermal sensitive medium when the medium passes adjacent to a local hot spot on a thermal printhead. In direct thermal printers, the medium is a temperature-sensitive paper which passes by in intimate contact with an electrically resistive print bead on the printhead. In thermal transfer printers, the image is transferred from a thermal transfer ribbon carrying a waxy ink to the print stock, the thermal transfer ribbon passing by in intimate contact with the thermal printhead. For both printers, passage of the temperature-sensitive paper or the thermal transfer ribbon past the printhead causes a separation of charge resulting from the triboelectric effect. This effect generates a static electric charge on the surface of the printhead. Thermal printheads are generally made from electrically nonconductive material so that the static charge generated by the triboelectric effect tends to stay where it is.

The build-up of static charge on the surface of a thermal printhead is a primary cause of printhead failure. Studies indicate that the accumulation of charge near the print bead of the printhead leads to a breakdown of local areas of the print bead, causing the local resistance of the print bead to diminish. If the resistance is diminished sufficiently to cause a significant rise in power dissipation, this initial resistance change alone, i.e., the resistance decrease due to static discharge, is sufficient to be considered a failure, especially in applications where it is important to control the size of a printed element, such as bar code. Additionally, the localized areas having diminished resistance experience wider temperature extremes that cause those areas of the print bead to undergo more thermal stress than the remainder of the print bead.

In the case where the initial resistance decrease due to static discharge is not sufficient to be considered a failure, ultimate failure may occur after the added thermal stress causes the localized area of the print bead to undergo an irreversible resistance increase to the point where the local area is incapable of heating the print medium sufficiently to create a mark.

The need to control static electricity has long been recognized in environments requiring the passage of sheets of paper and the like over various conveyor systems. Anti-static agents, which are generally water-absorbent, can be added to the stock when it is manufactured. However, such agents have been found completely effective only at relative humidities above 40%. Below 20% relative humidity, these anti-static agents have not been found to add significantly to the printhead life. Similarly, passive static dissipation devices, such as grounded carbon fiber or copper tinsel, can be used to generate ions, but not sufficiently near the area where the static charge separation is taking place. Active systems, such as electrical or nuclear ion generators, may be effective at dissipating static charge at the printhead, but are prohibitively expensive for this application.

DISCLOSURE OF THE INVENTION

It is an object of the present invention to provide a thermal printhead having a structure which prevents the accumulation of static charge on the surface of the thermal printhead.

In general, the thermal printhead comprises one or more first leads, one or more second leads, and a resistive heating element connected to at least one of the first leads and at least one of the second leads. The printhead further comprises a thermally conductive, first electrically insulative layer formed over the resistive heating element and over the at-least-one first lead and the at-least-one second lead connected to the resistive heating element in the vicinity of their connections to the resistive heating element. The printhead further comprises a first electrically conductive layer formed over the surface of the electrically insulative layer and connected to an electrical ground. The one or more first leads can be formed over a substrate, and the first electrically conductive layer can be made from chromium, for example. In further embodiments, an activating layer of $Al_2O_3$ or $TiO_2$ can be formed between the first electrically insulative layer and the first electrically conductive layer.

BEST MODE FOR CARRYING OUT THE INVENTION

Figure 1:
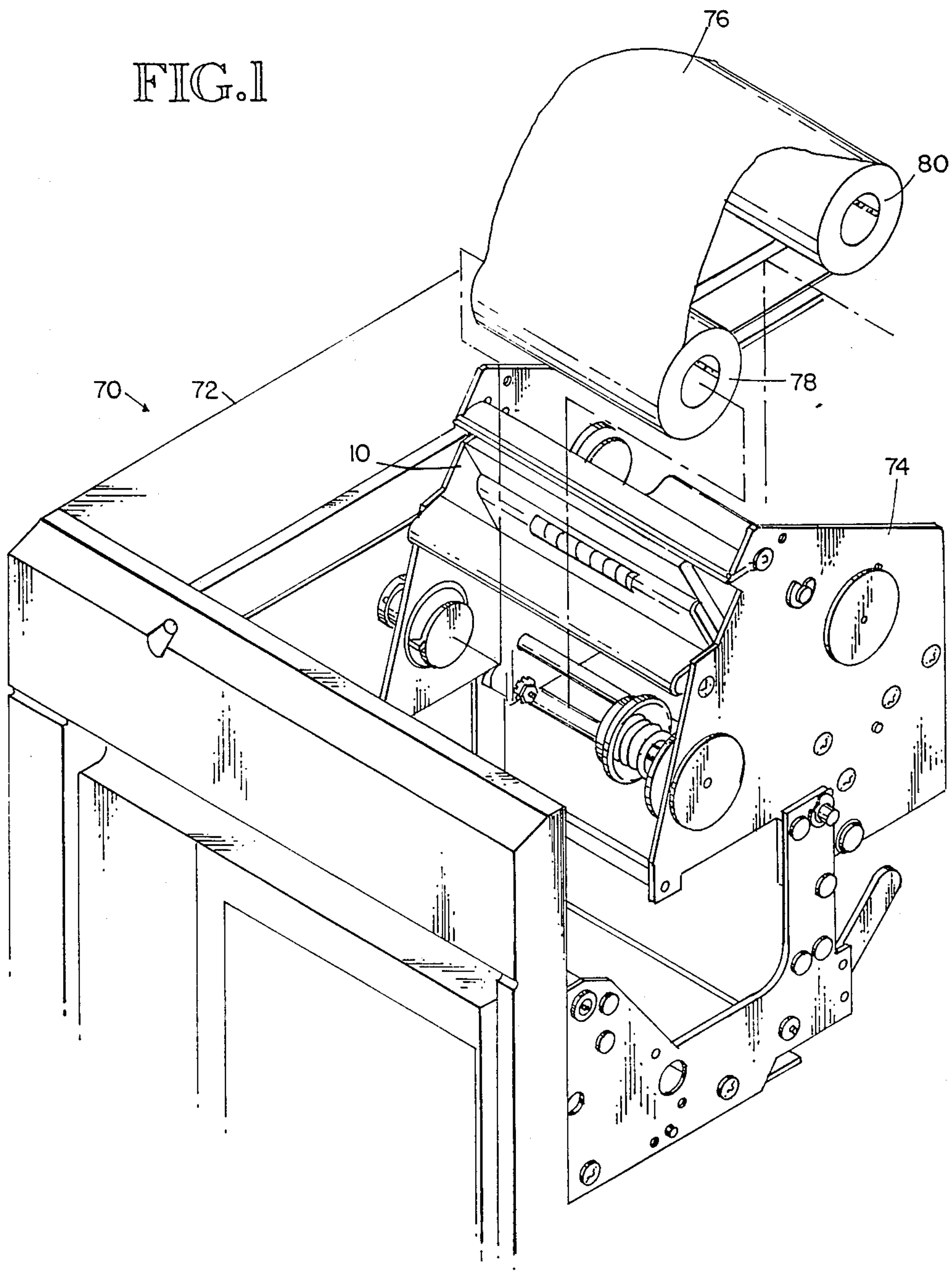
FIG. 1 is an isometric view of a thermal printer.

FIG. 1 is an isometric view of a thermal printer. Printer 70 contains, within its case 72, a ribbon module 74 which can take two positions, an open position (as shown) and a closed position. When ribbon module 74 is in its open position, transfer ribbon 76 can be changed. Transfer ribbon 76 is exchanged from supply roll 78 to take-up roll 80. Transfer ribbon 76 has a backing sheet 82 which forms one side of transfer ribbon 76, and a waxy ink 84 which is selectively melted to label stock by the melting action of printhead 10. In its closed position, ribbon module 74 causes transfer ribbon 76 and the label stock to pass between a driving roller (not shown) and printhead 10.

Figure 2:
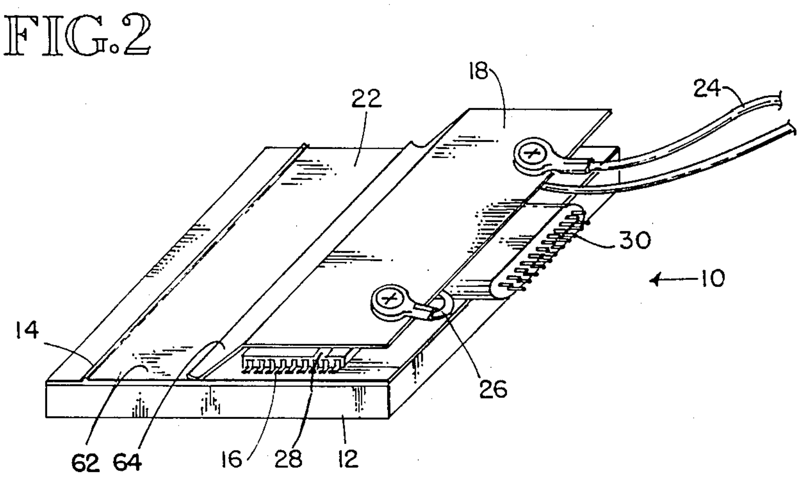
FIG. 2 is an isometric view of the thermal printhead.

FIG. 2 is an isometric view of the thermal printhead of the present invention. The printhead 10 is built on a substrate 12, preferably, but not necessarily, made from a ceramic material and consisting primarily of a print bead 14, associated electronic driver circuitry 16, and an electrically conductive printhead driver cover 18. Driver cover 18 is spring loaded in reaction to the forces imposed by retaining screws 20 to maintain electrical contact with upper surface 22. Cover 18 is connected to electrical ground through grounding conductor 24. Electrical conductor 26 connects grounded cover 18 to points in electronic driver circuitry 16 that should be grounded. In particular, grounding strap 28 is grounded through electrical conductor 26.

The electronic driver circuitry 16 is connected to shift serially received data across the linear array of drivers that control individual printer elements created along a print bead 14. In one embodiment, print bead 14 can be electronically driven to create 416 individual dots, each dot extending 9.84 thousandths of an inch in the direction along print bead 14. Therefore, the thermal printer of which printhead 10 is a part can create straight lines up to approximately 4.1 inch in length.

After the data have been serially loaded into the individual print element drivers through electrical connector 30, the circuitry receives a strobe pulse which causes the individual print elements to heat or not to heat, depending upon whether a 1 or a 0 has been loaded into the corresponding driver.

Print bead 14 creates transverse lines on the temperature-sensitive media as the media passes, in intimate contact with print bead 14, from right to left over printhead 10. The printing medium is incrementally driven by a stepper motor, the increments being substantially equal to the width of the line created by print bead 14. This allows solid characters to be created by printhead 10.

Figure 3:
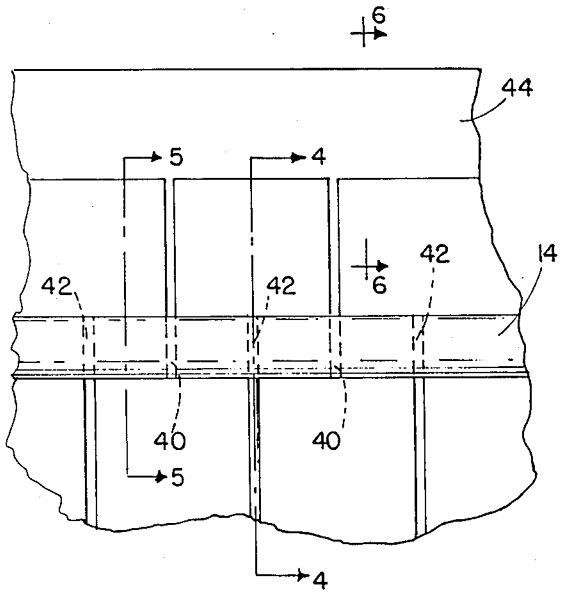
FIG. 3 is a closeup plan view of the vicinity of the print bead of the thermal printhead of FIG. 2.

FIG. 3 is a closeup plan view of the vicinity of print bead 14 of thermal printhead 10. Print bead 14 is a continuous linear bump that rises above the general level of upper surface 22 of printhead 10 (see FIG. 1). Print bead 14 is defined by the deposition of a thin, linear strip of resistive material which heats when it receives electrical current. The structure of print bead 14 will be shown in greater detail subsequently. Returning to FIG. 3, print bead 14 lies over and comes into contact with one or more first conductive leads 40 and one or more second conductive leads 42. First and second conductive leads 40 and 42 are uniformly interdigitated under print bead 14 with a center-to-center spacing of approximately 4.92 mils, the width of the conductive leads 40 and 42 themselves being substantially smaller than the center-to-center spacing. First conductive leads 40, which can serve as anode leads, are held at a predetermined supply voltage through their connection to conductor 44, upon which supply voltage is imposed. Second conductive leads 42 can be grounded or not through the electronic driver circuitry 16 (in FIG. 1). If a particular second conductive lead, which may be a cathode lead, is grounded, a conductive path is completed between the grounded second conductive lead 42 and the two adjacent first conductive leads 40, permitting the passage of electric current between them through print bead 14. The resulting conducted current causes the local portion of print bead 14 surrounding the grounded second conductive lead 42 to heat, thereby creating a small rectangular dot whose transverse extent equals the center-to-center separation between first conductive leads 40. If, on the other hand, a second conductive lead 42 is not grounded, the local area surrounding the second conductive lead 42 will not heat and a black dot will not be created thereby.

In the current implementation, the electrical resistance of a single linear print element is approximately 250 ohms. When appropriately grounded through a second conductive lead 42, a typical print element experiences a temperature rise of approximately 300° C. above its ambient temperature of 50° C. in less than two milliseconds, the period of time for which a second conductive lead 42 is grounded. When second conductive lead 42 is disconnected from ground, the print element returns to ambient temperature.

Figure 4:
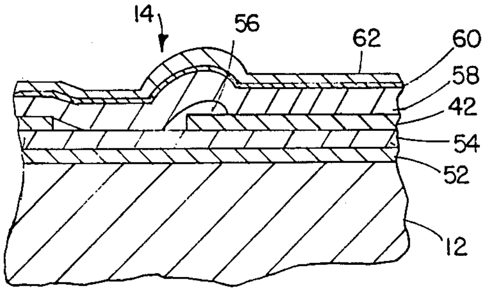
FIG. 4 is a fragmentary cross-sectional view of the printhead of FIG. 3, taken along section 4—4.

FIG. 4 is a fragmentary cross-sectional view of the printhead of FIG. 3, taken along section 4—4. The structure in the vicinity of print bead 14 is created over substrate 12. The structure can consist of an anode supply sheet conductor 52 formed on the surface of substrate 12. Sheet conductor 52 is connected to a source of the anode voltage and will be discussed in greater detail subsequently. Glass underglaze 54 is formed over sheet conductor 52 and serves to electrically insulate sheet conductor 52 from the layers formed over glass underglaze 54 in those areas where such insulation is desired. Along section 4—4 of FIG. 3, a portion of glass underglaze 54 is covered by second conductor lead 42, which extends under and makes electrical contact with the semicircular form of resistive element 56. Another portion of glass underglaze 54 is overlaid by glass overglaze 58. Depending upon the manufacturing tolerances in the placement of resistive element 56 with respect to the end of second conductive lead 42, resistive element 56 can either contact glass underglaze 54 or lie entirely over second conductive lead 42. Glass overglaze 58 covers the resistive element 56 and a portion of second conductor lead 42 in the vicinity of the electrical connection between second conductive lead 42 and resistive element 56. If desired, glass overglaze 58 can cover substantially all of second conductive lead 42.

Figure 5:
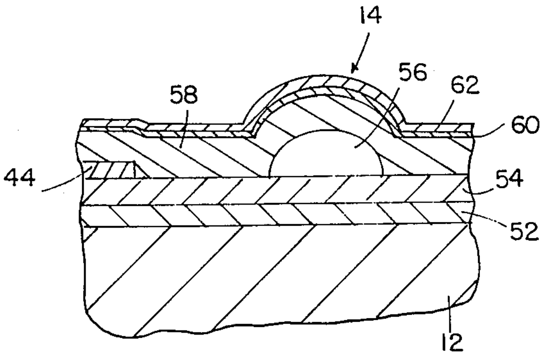
FIG. 5 is a fragmentary cross-sectional view of the printhead of FIG. 3, taken along section 5—5.

FIG. 5 is a fragmentary cross-sectional view of the printhead of FIG. 3, taken along section 5—5. The printhead is formed over substrate 12 and anode supply sheet conductor 52, which can be a thin layer of gold, and extends to edge 46 of printhead 10 (see FIG. 2). Glass underglaze 54 is formed over the surface of sheet conductor 52, but does not extend to edge 46. Conductor 44, which is typically made from the same material as sheet conductor 52, extends from edge 46 back toward resistive element 56 of print bead 14 and overlapping glass underglaze 54. Along section 5—5 of FIG. 3, there are no conductor leads making contact with resistive element 56. Therefore, after resistive element 56 has been formed on glass underglaze 54, glass overglaze 58 covers resistive element 56 and at least some surrounding portions of glass underglaze 54.

The thermal printhead structure defined up to this point in connection with FIGS. 4 and 5 is a typical thermal printhead structure. Such a printhead can be purchased from Rohm Company. Other specific forms of thermal printheads are also available using a thermally conductive, electrically insulative overglaze.

A novel aspect of the present invention is the creation of an additional conductive layer over the printhead structure defined so far. The surface of glass overglaze 58 is typically passivated. Therefore, in order to ensure that the electrically conductive surface layer to be created will adhere adequately, activating primer layer 60, which may consist of a layer of aluminum oxide ($Al_2O_3$) or titanium dioxide ($TiO_2$), is deposited over glass overglaze 58. Activating primer layer 60 is found to perform adequately when it has thicknesses in the range of 10 to 100 Angstroms, with 10-Angstrom layer resulting in excellent thermal transfer from the resistive element through the conductive surface layer to the printing medium. Activating primer layer 60 is then coated with electrically conducting outer layer 62, which may, by way of example, be a 100-Angstrom-thick layer of chromium.

Figure 6:
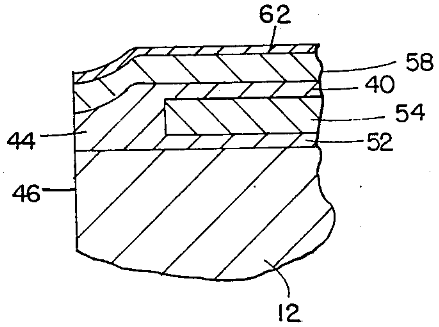
FIG. 6 is a fragmentary cross-sectional view of the printhead of FIG. 3, taken along section 6—6.

In some instances, where the direct adherence of conducting outer layer 62 to glass overglaze 58 is found to be adequate, it may not be necessary to form an activating primer layer between the glass overglaze and conducting outer layers. In this case, the thermal printhead structure shown in the fragmentary cross-sectional view of FIG. 6 will be used. In this structure, which is formed over substrate 12, anode supply sheet conductor 52 is connected with first conductive lead 40 through conductor 44, which is formed adjacent edge 46. Conductors 52 and 44 and conductive lead 40 can be formed, for example, from gold. First conductive lead 40 is supported by glass underglaze 54, which is formed over sheet conductor 52, but does not extend fully to edge 46. The upper surface of first conductive lead 40 is covered by glass overglaze 58 and then by conducting outer layer 62.

Static electricity generated by the passage of media over printhead 10 is dissipated by conducting outer layer 62, which is electrically grounded. One method for providing such grounding is shown in FIG. 2, where conducting outer layer 62 is intimately contacted by spring-loaded edge 64 of conductive printhead driver cover 18. Cover 18 is grounded through grounding conductor 24. Other methods for grounding conducting outer layer 62 will, of course, be apparent to one skilled in the art.

In practice, it has been found that print bead 14 can be spaced approximately 100 mils behind edge 46 of printhead 10 (see FIG. 2). It has also been found that the edge of conducting outer layer 62 can be separated from edge 46 by approximately 50 mils. This spacing results in the avoidance of unintentional short circuits between conducting outer layer 62 and conductor 44. Similar spacing should be maintained around any exposed electrical connections.

While the foregoing detailed description has described two preferred embodiments of the present invention, it will be apparent to those skilled in the art that various modifications of the present invention can be made without departing from its scope and spirit, which is to be limited only by the following claims.

We claim:

1. A thermal printhead for dissipating static electric charge accumulated on the surface of the printhead, comprising:

one or more first leads;

one or more second leads;

a resistive heating element connected to at least one of the first leads and at least one of the second leads;

a thermally conductive, first electrically insulative layer formed over the resistive heating element and over the at-least-one first lead and the at-least-one second lead connected to the resistive heating element in the vicinity of their connection to the resistive heating element; and a first electrically conductive layer formed over the surface of the first electrically insulative layer, and over the resistive heating element, and connected to an electrical ground.

2. The thermal printhead of claim 1 wherein the one or more first leads are formed over a substrate.

3. The thermal printhead of claim 2 wherein the substrate is a ceramic substrate.

4. The thermal printhead of claim 1 wherein the one or more first leads and the one or more second leads are formed over a second electrically insulative layer.

5. The thermal printhead of claim 4 wherein the one or more first leads are connected to a second electrically conductive layer, the second electrically insulative layer being formed over the second electrically conductive layer.

6. The thermal printhead of claim 5 wherein the second electrically conductive layer is formed over a substrate.

7. The thermal printhead of claim 6 wherein the substrate is a ceramic substrate.

8. The thermal printhead of claim 1 wherein the first electrically conductive layer is made from chromium.

9. A thermal printhead for dissipating static electric charge accumulated on the surface of the printhead, comprising:

one or more first leads;

one or more second leads;

a resistive heating element connected to at least one of the first leads and at least one of the second leads;

a thermally conductive, first electrically insulative layer formed over the resistive heating element and over the at-least-one first lead and the at-least-one second lead connected to the resistive heating element in the vicinity of their connection to the resistive heating element;

an activating layer formed over the surface of the electrically insulative layer; and a first electrically conductive layer formed over the surface of the activating layer, and over the resistive heating element, and connected to an electrical ground.

10. The thermal printhead of claim 9 wherein the activating layer is made from $Al_2O_3$.

11. The thermal printhead of claim 9 wherein the activating layer is made from $TiO_2$.

12. The thermal printhead of claim 10 wherein the first electrically conductive layer is made from chromium.

13. The thermal printhead of claim 11, wherein the first electrically conductive layer is made from chromium.

* * * * *